United States Patent
Mammou (10) Patent No.: US 10,055,857 B2
(45) Date of Patent: Aug. 21, 2018

(54) EXTENSION OF THE MPEG/SC3DMC STANDARD TO POLYGON MESHES

(71) Applicant: ATI Technologies ULC, Markham (CA)

(72) Inventor: Khaled Mammou, Thornhill (CA)

(73) Assignee: ATI Technologies ULC, Markham, Ontario (CA)

( * ) Notice: Subject to any disclaimer, the term of this patent is extended or adjusted under 35 U.S.C. 154(b) by 242 days.

(21) Appl. No.: 14/473,242

(22) Filed: Aug. 29, 2014

(65) Prior Publication Data

US 2016/0063737 A1 Mar. 3, 2016

(51) Int. Cl.
*G06T 9/00* (2006.01)
*G06T 17/20* (2006.01)

(52) U.S. Cl.
CPC ............ *G06T 9/001* (2013.01); *G06T 17/205* (2013.01)

(58) Field of Classification Search
CPC .................................................... G06T 9/001
See application file for complete search history.

(56) References Cited

U.S. PATENT DOCUMENTS

| | | | |
|---|---|---|---|
| 6,469,701 B1 | 10/2002 | Gumhold | |
| 2003/0234784 A1* | 12/2003 | Grzeszczuk | G06T 15/205 345/426 |
| 2004/0113909 A1* | 6/2004 | Fenney | G06T 17/30 345/419 |
| 2012/0229464 A1* | 9/2012 | Fishwick | G06T 17/20 345/423 |
| 2013/0271463 A1 | 10/2013 | Curington et al. | |
| 2014/0160241 A1* | 6/2014 | Cai | H04N 19/20 348/43 |
| 2014/0168221 A1 | 6/2014 | Fishwick | |

FOREIGN PATENT DOCUMENTS

WO 2014005415 A1 1/2014

OTHER PUBLICATIONS

Math Open Reference (published at http://www.mathopenref.com/polygontriangles.html as of Aug. 4, 2013, archived at https://web.archive.org/web/20130804095317/http://www.mathopenref.com/polygontriangles.html).*
PCT Search Report & Written Opinion, PCT Application No. PCT/CA2015/050803, dated Nov. 17, 2015, 9 pages.
Mamou et al., "A Triangle Fan Based Approach for Low Complexity 3D Mesh Compression", 16th IEEE International Conference on Image Processing (ICIP), IEEE, 2009, 4 pages.
Mamou et al., "TFAN: A low complexity 3D mesh compression algorithm," Computer Animation and Virtual Worlds 2009; 20:1-12; Published online in Wiley InterScience (www.interscience.wiley.com) DOI: 10.1002/cav.319; Copyright 2009 John Wiley & Sons, Ltd. (13 pages).

(Continued)

*Primary Examiner* — William A Beutel
(74) *Attorney, Agent, or Firm* — Volpe and Koenig, P.C.

(57) ABSTRACT

A system, method and computer program product to traverse a polygon mesh, partition the polygon mesh into a set of polygon fans based on the traversal order, and tessellate the set of polygon fans into triangles based on the traversal order. This transformation of the polygon mesh into a triangle mesh enables the polygon mesh to be compressed and decompressed using the SC3DMC standard.

18 Claims, 7 Drawing Sheets

(56) References Cited

OTHER PUBLICATIONS

Mamou, K., et al., "TFAN: A low complexity 3D mesh compression algorithm," Computer Animation and Virtual Worlds, vol. 20, 12 pages (2009).
"Connectivity Compression for Irregular Quadrilateral Meshes", King et al., May 4, 2000; XP055450879; retrieved from the Internet: URL:http://www.cc.gatech.edu/jarek/papers/quads.pdf., pp. 1-21.
EP 15835181.7 Extended European Search Report dated Feb. 23, 2018.

* cited by examiner

FIG. 4 vx: original vertex index
v'x: vertex index based on the deterministic traversal order

EXTENSION OF THE MPEG/SC3DMC STANDARD TO POLYGON MESHES

BACKGROUND

Field

The present disclosure is generally directed to graphics compression. More particularly, the present disclosure is directed to polygon mesh compression.

Background Art

The desire to create more realistic 3D computer graphics has increased in recent years. In order to create more realistic 3D computer graphics, 3D objects generally need to be represented by finer grain polygon meshes.

A polygon mesh is a collection of vertices, edges and faces that define the shape of an object. The more vertices, edges, and faces represented by the mesh the more realistic the object will look. An increase in the number of vertices, edges, and faces, however, requires more memory. This can be a significant issue in environments where memory or bandwidth is constrained. Thus, it is desirable to find ways to compress polygon meshes.

SUMMARY OF EMBODIMENTS

Embodiments include techniques to traverse a polygon mesh, partition the polygon mesh into a set of polygon fans based on the traversal order, and tessellate the set of polygons fan into triangles based on the traversal order. This mechanism allows a polygon mesh to be compressed and decompressed using the Scalable Complexity 3D Mesh Compression-Triangle-Fan (SC3DMC-TFAN) standard. As a result, the mechanism allows maximum reuse of SC3DMC encoders and decoders.

SUMMARY OF EMBODIMENTS

Embodiments described herein include a system, a computer-readable medium and a computer-implemented method for compressing and decompressing a polygon mesh using the SC3DMC-TFAN standard. Further features and advantages of the embodiments, as well as the structure and operation of the embodiments, are described in detail below with reference to the accompanying drawings. It is noted that the embodiments are not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the embodiments and to enable a person of ordinary skill in the relevant art to make and use the disclosed embodiments.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the embodiments, and well-known elements of the embodiments may not be described in detail or may be omitted so as not to obscure the relevant details of the embodiments. In addition, the terminology used herein is for the purpose of describing particular embodiments only and is not intended to be limiting of the embodiments. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

1. Overview

The present disclosure is directed to embodiments related to a system and method for compressing polygon meshes. There are several standards for mesh compression. One of the most common is the MPEG/SC3DMC (Moving Picture Experts Group/Scalable Complexity 3D Mesh Compression) standard. This standard defines various algorithms to compress triangle meshes. The SC3DMC Triangle-Fan (TFAN) algorithm offers the best compression ratio. The SC3DMC-TFAN algorithm, however, cannot be used to compress arbitrary n-sided (or n-order) polygon meshes. Rather the SC3DMC TFAN algorithm only works with triangle meshes (i.e., an n-sided polygon with n=3).

A triangle mesh is a special case of a polygon mesh. Specifically, a 3D object is represented as a collection of triangles instead of as a collection of polygons. However, while a triangle mesh is a special type of polygon mesh, polygon meshes are still highly useful when modeling 3D objects. The presence of quadrilaterals, pentagons, hexagons, and higher order polygons enables a 3D modeler to more easily and accurately model 3D objects.

Given the foregoing, what is needed are systems and methods that can compress and decompress polygon meshes using the SC3DMC-TFAN standard. Desirably, such systems and methods would allow use of existing implementations of the SC3DMC-TFAN standard.

Figure 1:
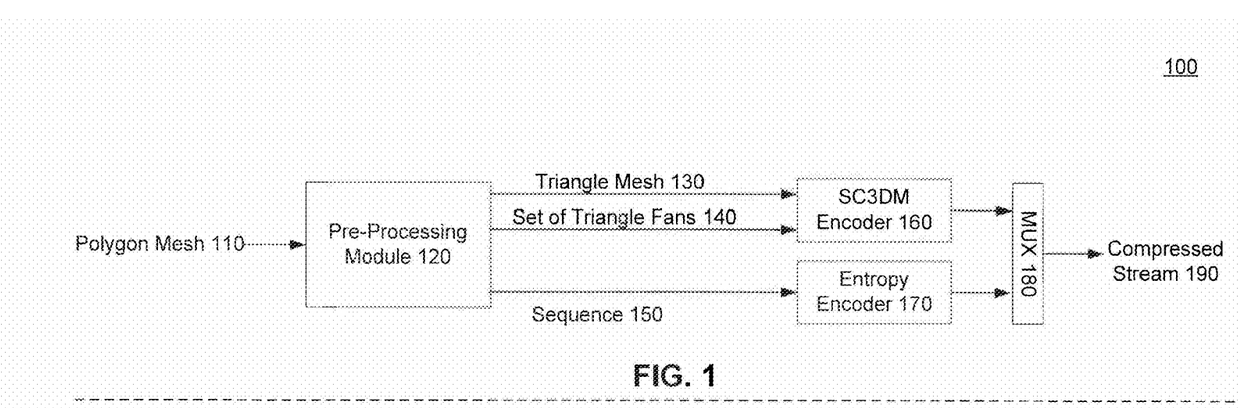
FIG. 1 illustrates a block diagram of a system that compresses a polygon mesh, according to an embodiment.

2. System and Method for Compressing a Polygon Mesh Using the SC3DMC-TFAN Standard FIG. 1 depicts a block diagram 100 of an example functional block diagram of a system for compressing a polygon mesh using the SC3DMC-TFAN standard. Block diagram 100 includes various elements, such as a pre-processing module 120, a SC3DMC encoder 160, an entropy encoder 170, and a MUX 180. These elements may be implemented in hardware or software.

Pre-processing module 120 receives a polygon mesh 110. Pre-processing module 120 tessellates polygon mesh 110. By tessellating polygon mesh 110, polygon mesh 110 can be compressed using the SC3DMC-TFAN standard. This tessellation is performed in a specific way and generates a triangle mesh 130, a set of triangle fans 140, and a sequence 150.

Triangle mesh 130 is a representation of polygon mesh 110 as a collection of triangles. In other words, each polygon in polygon mesh 110 is partitioned into one or more triangles.

Set of triangle fans 140 is a representation of triangle mesh 130 as a set of triangle fans. A triangle fan is a primitive in 3D computer graphics that saves on storage space. Specifically, a triangle fan describes a set of connected triangles that share one central vertex. A triangle fan saves storage space because if N is the number of triangles in the fan, the number of vertices needed to describe the triangle fan is N+2. This is an improvement over the 3*N vertices that would be necessary to describe the triangles separately. Set of triangle fans 140 is used to guide SC3DMC encoder 160 when compressing triangle mesh 130.

Sequence 150 is a sequence of numbers, and each number represents the number of triangles composing each polygon in polygon mesh 110. Transmitting sequence 150 enables polygon mesh 110 to be reconstructed from triangle mesh 130.

SC3DMC encoder 160 receives both triangle mesh 130 and set of triangle fans 140. SC3DMC encoder 160 generates a compressed version of triangle mesh 130 according to the SC3DMC-TFAN standard. SC3DMC encoder 160 is designed to compress a triangle mesh. Therefore, because SC3DMC encoder 160 receives triangle mesh 130 and set of triangle fans 140 from pre-processing module 120, SC3DMC encoder 160 can compress polygon mesh 110.

Entropy encoder 170 receives and compresses sequence 150. As would be appreciated by a person of ordinary skill in the art, various compression algorithms may be used. For example, sequence 150 may be compressed based on statistical correlations in the sequence.

MUX 180 receives a compressed version of triangle mesh 130 from SC3DMC encoder 160. In addition, MUX 180 receives a compressed version of sequence 150 from entropy encoder 170. MUX 180 multiplexes both pieces of information into compressed stream 190.

Figure 2:
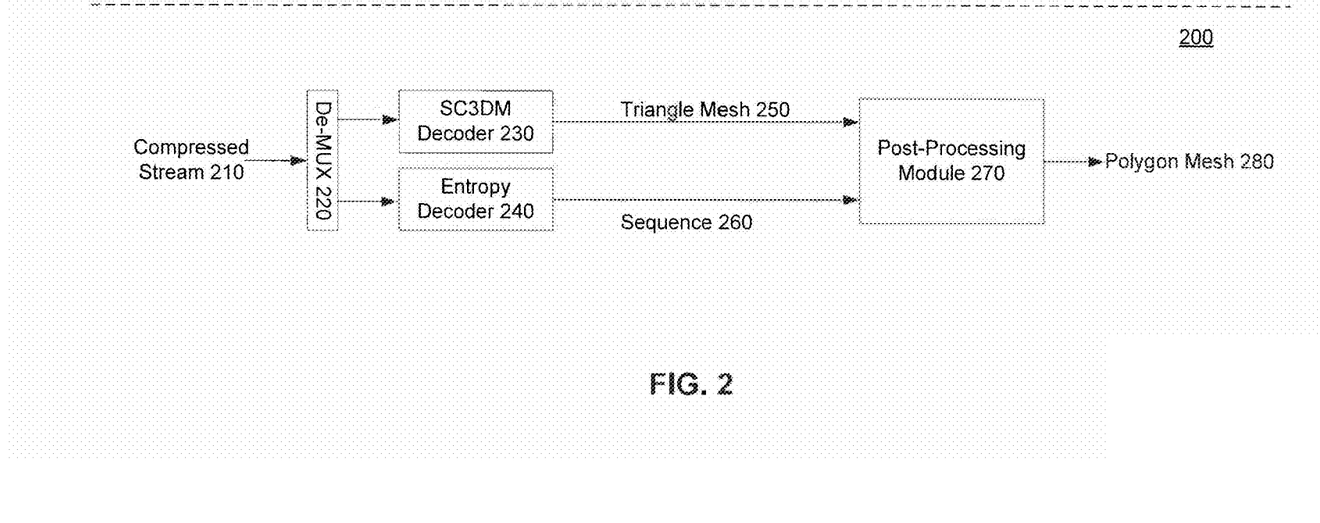
FIG. 2 illustrates a block diagram of a system that decompresses a polygon mesh, according to an embodiment.

FIG. 2 depicts a block diagram 200 of an example functional block diagram of a system for decompressing a compressed stream 210. Compressed stream 210 represents compressed versions of both polygon mesh 110 and sequence 150. Block diagram 200 includes various elements, such as a De-Mux 220, a SC3DMC decoder 230, an entropy decoder 240, and a post-processing module 270. These elements may be implemented in hardware or software.

De-Mux 220 receives compressed stream 210. De-MUX 220 de-multiplexes compressed stream 210 into a compressed version of triangle mesh 130. The compressed version of triangle mesh 130 is sent to SC3DMC decoder 230. De-MUX 220 also de-multiplexes compressed stream 210 into a compressed version of sequence 150. The compressed version of sequence 150 is sent to entropy decoder 240.

SC3DMC decoder 230 receives the compressed version of triangle mesh 130 and produces triangle mesh 250. Triangle mesh 250 is identical to triangle mesh 130. Similarly, entropy decoder 240 receives the compressed version of sequence 150 and produces sequence 260. Sequence 260 is identical to sequence 150.

Post-processing module 270 merges triangles from triangle mesh 250 into polygons based on sequence 260. Specifically, post-processing module 270 traverses the vertices in triangle mesh 250 according to the traversal order specified by pre-processing module 120. At each stage, all the triangles incident to the current vertex are ordered in their decoding order. Next, the number of triangles composing the next polygon is read from sequence 260. The corresponding number of triangles are then merged into a single polygon. The operation is repeated until all the triangles incident to the current vertex are visited.

Figure 3:
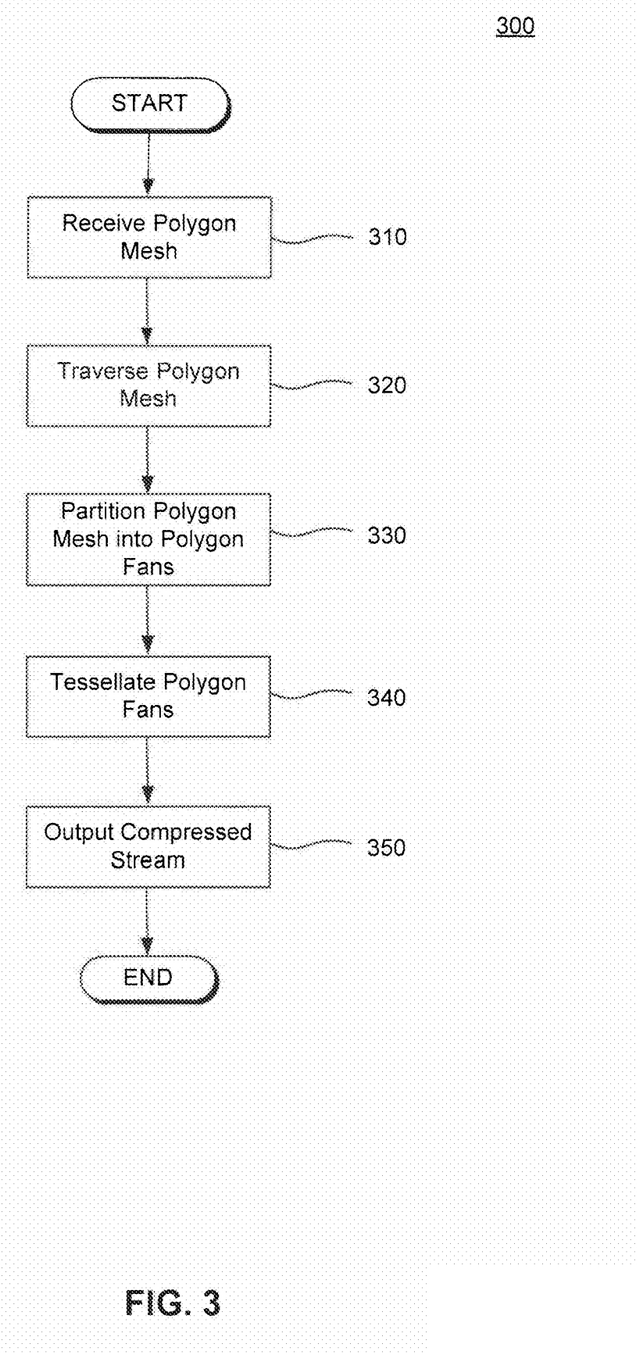
FIG. 3 illustrates a flowchart of an exemplary method for compressing a polygon mesh, according to an embodiment.

FIG. 3 depicts a block diagram illustrating a method 300 for compressing a polygon mesh in accordance with an embodiment. As alluded to above and described in more detail below, method 300 may be embodied in software or hardware. To better understand the operations depicted in FIG. 3, reference is made to the example polygon mesh 500 depicted in FIG. 5, polygon mesh 600 partitioned into polygon fans depicted in FIG. 6, and the tessellation of polygon fans of polygon mesh 700 depicted in FIG. 7.

Figure 5:
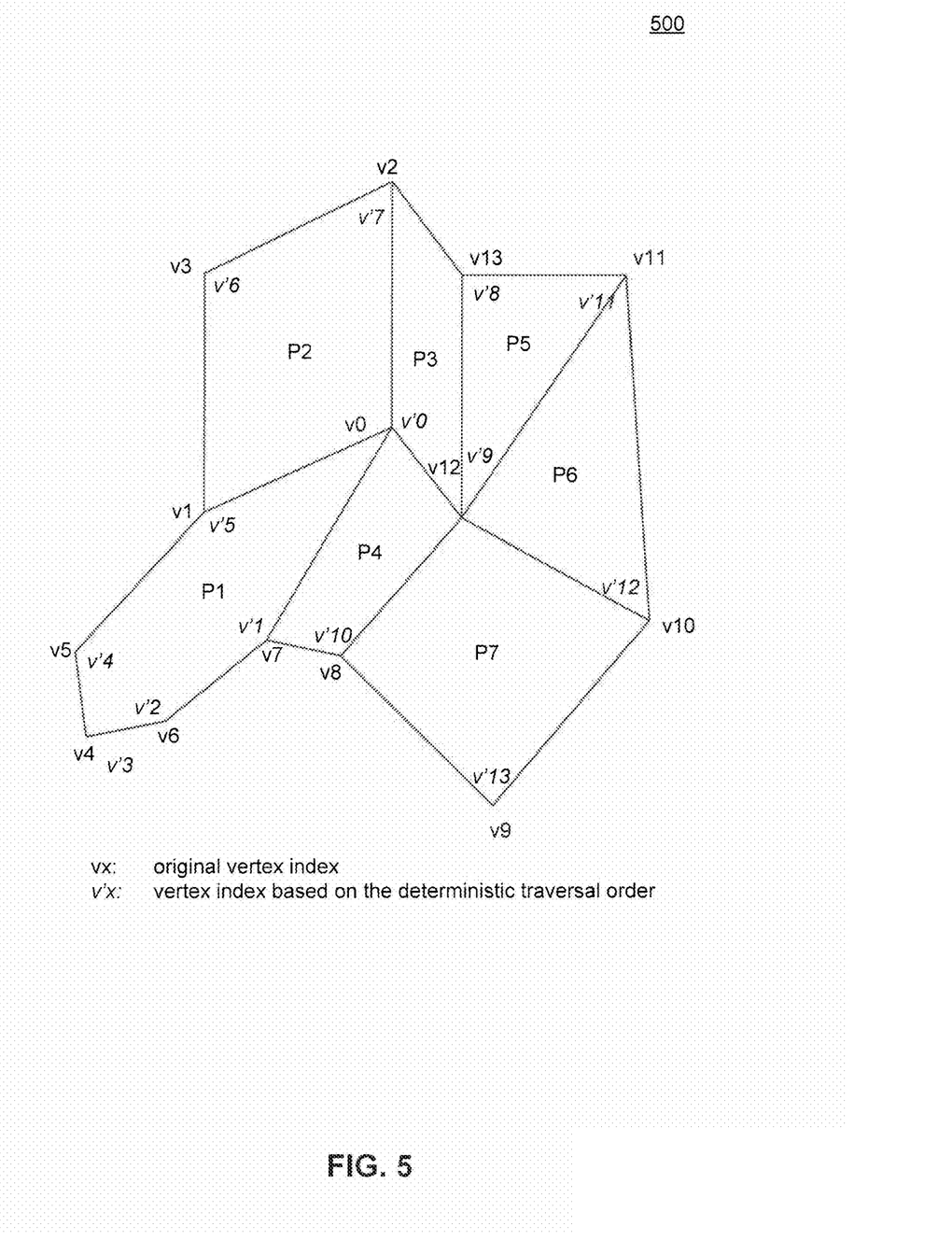
FIG. 5 depicts an example order in which vertices of a polygon mesh are traversed for compression purposes, according to an embodiment.

Referring to FIG. 3, method 300 begins at step 310 in which pre-processing module 120 receives a polygon mesh. A polygon mesh is a collection of vertices, edges, and faces that define the shape of a polyhedral object in 3D computer graphics. For example, FIG. 5 illustrates a polygon mesh 500 composed of seven polygons, i.e. P1 to P7. Each polygon in the polygon mesh is defined by a set of vertices, and each vertex has an original index. For example, polygon P1 in FIG. 5 is defined by vertices with indices v0, v7, v6, v4, v5, and v1.

In a step 320, pre-processing module 120 traverses the vertices of the polygon mesh. In a preferred embodiment, pre-processing module 120 performs a neighbor-to-neighbor deterministic traversal of the vertices. The basic idea is to traverse the vertices in a unique order in order to partition the polygon mesh into a set of polygon fans.

A polygon fan is a primitive in 3D computer graphics that reduces storage space compared to representing a corresponding set of polygons individually. A polygon fan is a generalized case of a triangle fan and defines a set of connected polygons that share one central vertex. For example, FIG. 5 illustrates a polygon fan with a central vertex v0 comprising polygons P1, P2, P3, and P4.

A polygon fan may be defined by the traversal order of its vertices. Specifically, a polygon fan may be defined as an ordered sequence of vertices starting from its central vertex. For example, FIG. 5 illustrates a polygon fan with central vertex v0 comprising polygons P1, P2, P3, and P4. This polygon fan may be defined by the ordered sequence of vertices v0, v7, v6, v4, v5, v1, v0, v1, v3, v2, v0, v2, v13, v12, v0, v12, v8, v7, and v0. This ordered sequence of vertices defines the polygon fan.

A polygon fan has several properties. First, all the polygons of the polygon fan share a central vertex. The central vertex is the so-called center of the polygon fan. Second, each two successive polygons in the polygon fan are neighbors in the sense that they share a common edge. For example, polygons P1 and P2 of polygon mesh 600 in FIG. 6 share a common edge, i.e. (v0, v1). Third, neighboring polygons have the same orientation. Specifically, two neighboring polygons have the same orientation if their common edge would be traversed in opposite directions for the polygon fan. For example, based on above traversal order, the common edge (v0, v1) of polygons P1 and P2 is traversed in opposite directions.

In order to partition a polygon mesh into a set of polygon fans according to step 320, pre-processing module 120 defines a unique traversal order of the vertices of the polygon mesh. As mentioned, in a preferred embodiment, pre-processing module 120 performs a neighbor-to-neighbor deterministic traversal of the vertices of the polygon mesh. The basic idea is to relabel each vertex index of the polygon mesh based on the neighbor-to-neighbor deterministic traversal.

In a preferred embodiment, pre-processing module 120 performs the neighbor-to-neighbor deterministic traversal as follows. In the beginning, the whole set of vertices in the polygon mesh is considered non-visited. An arbitrary vertex from the polygon mesh is then selected. The selected vertex is preferably stored in a First-In-First-Out (FIFO) data structure, e.g. F. At each stage, a vertex is then extracted from F and relabeled based on its traversal order.

For each extracted vertex, pre-processing module 120 determines a set of incident polygons that have not yet been considered. This set of incident polygons is then partitioned into a set of polygon fans according to step 330. The vertices of each polygon fan are subsequently traversed, inserted into F, and marked as visited. Furthermore, the vertices are relabeled according to their traversal order. The process stops when F becomes empty and all vertices in the polygon mesh have been marked as visited.

In a preferred embodiment, a counter is used to relabel the vertices based on their traversal order. Specifically, the counter is initialized to zero and incremented each time a new, non-visited vertex is extracted from F. Thus, the counter's value defines the traversal order of a vertex in the polygon mesh. For example, the jth vertex extracted from F would have a traversal order equal to j.

Several different strategies may be considered for partitioning a set of incident polygons into a set of polygon fans. In a preferred embodiment, an iterative approach is used. This preferred embodiment is discussed below in step 330. A person of ordinary skill in the art would appreciate that other approaches may be used.

In a step 330, pre-processing module 120 partitions the polygon mesh into a set of polygon fans. In other words, for each extracted vertex in step 320, a set of polygons incident to the extracted vertex are partitioned into a set of polygon fans.

Specifically, consider the jth vertex extracted from F. This is the jth vertex traversed, denoted by v'j. At each iteration n, a polygon fan PF(n)(j) is created starting from polygon P1(j) incident to v'j, wherein P1(j) has a minimum number of neighboring polygons. A neighboring polygon to P1(j) in PF(n)(j) is a polygon that shares an edge with P1(j), is non-visited, and has the same orientation as P1(j). P1(j) is then added to polygon fan PF(n)(j) and marked as visited.

This procedure is then repeated. For example, an incident polygon to v'j that is non-visited, a neighbor to P1(j), and has the same orientation as P1(j), is randomly selected. This incident polygon is then added to polygon fan PF(n)(j) and marked as visited.

Each time an incident polygon is added to polygon PF(n)(j), its vertices are added to F. These vertices are extracted, traversed, relabeled based on their traversal order (if non-visited), and marked as visited. In a preferred embodiment, a polygon's vertices are traversed in a clockwise fashion. In addition, pre-processing module 120 determines a set of incident polygons for each extracted vertex that have not been previously visited. The vertices in this set of incident polygons are also added to F.

The process continues until it is impossible to select a neighboring polygon of the same orientation that is non-visited. When this occurs, a new polygon fan must be created. Pre-processing module 120 creates a new polygon fan starting from the next extracted vertex v'k that has incident polygons that have not been considered. After identifying an incident polygon P1(k) for the extracted vertex v'k, P1(k) is added to the polygon fan PF(n)(k) and is marked as visited. In addition, the vertices associated with P1(k) are added to F.

To better understand the operations described above, steps 320 and 330 are described with reference to polygon mesh 500 in FIG. 5. As mentioned above, FIG. 5 illustrates a polygon mesh 500 composed of seven polygons, i.e. P1 to P7. Polygon mesh 500 is defined by a set of vertices, i.e. v1 to v13. The index of these vertices, however, may not define a traversal order for the polygons, let alone for a set of polygon fans. For example, polygon P2 is defined clockwise by vertices v0, v1, v3, and v2. These indices, however, do not define a traversal order of P2. Accordingly, the vertices of polygon mesh 500 need to be relabeled.

In step 320, vertex v0 is arbitrarily selected and relabeled v'0. This is because v0 was the first vertex traversed. Polygons P1, P2, P3, and P4 are incident to vertex v'0. Accordingly, these incident polygons are partitioned into a set polygon fans according to step 330.

In step 330, polygon-fan 0 is created starting from polygon P1 which is incident to v'0. P1 is added to polygon-fan 0. In addition, the vertices of P1 are added to F. As each vertex from P1 is extracted from F, each vertex is relabeled based on its traversal order. In the preferred embodiment, the vertices of P1 are traversed in a clockwise fashion.

In addition, pre-processing module 120 determines new incident polygons to each extracted vertex. For example, vertex v7 is extracted from F, relabeled as v'1, v7 being the second vertex traversed, and marked as visited. Note that v'1 has two incident polygons, i.e. P1 and P4; as these polygons have already been considered with respect to v'0, their associated vertices are not added to F. The traversal continues with vertices v6, v4, v5, and v1 being relabeled as v'2, v'3, v'4, and v'5, respectively. Polygon P1 is then marked as visited. After the traversal of P1, incident polygon P2 is considered for inclusion in polygon-fan 0. Because P2 satisfies the properties for inclusion in a polygon fan, P2 is added to polygon-fan 0. Specifically, P1 and P2 share a central vertex, i.e. v0. In addition, P2 is a neighboring polygon of P1 because they share an edge, i.e. (v0, v1). Finally, P2 has the same orientation as P1 because their common edge (v0, v1) is traversed in the opposite directions. Given the above, and because P2 is non-visited, P2 is added to polygon-fan 0 and marked as visited.

The vertices of P2 are then added to F and subsequently traversed. As they are extracted from F they are relabeled based on their traversal order. However, because vertices v0 and v1 have already been visited, they are not relabeled. In other words, only non-visited vertices are relabeled. Thus, in the case of P2, v0 and v1 retain their relabeled indexes of v'0 and v'5. On the other hand, because v3 and v2 have not been visited, they are relabeled v'6 and v'7, respectively. As a result, the vertices of P2 are relabeled as v'0, v'5, v'6, and v'7.

Recall that the above process continues until it is impossible to obtain a polygon with neighbors of the same orientation that are non-visited. When that point is reached, a new polygon fan must be created. For example, polygon P3 is a neighbor polygon to P2, non-visited, and has the same orientation as P2. Therefore, polygon P3 is added to polygon-fan 0 and is marked as visited. However, after adding polygon P4 to polygon-fan 0, there are no more neighbor polygons to P4 that have the same orientation and are non-visited. In fact, a complete fan of polygons P1, P2, P3, and P4 has been created. As a result a new polygon fan must be created.

New polygon-fan 1 is created starting at v13. Recall that as each vertex is traversed each vertex is added to F. Further recall that as each vertex is extracted from F, the set of incident polygons to the extracted vertex is considered. The vertices of these incident polygons are then traversed and inserted into F. However, only new incident polygons are considered. Thus, when vertex v7 is extracted, neither P1 nor P4 is considered because they were already considered as incident polygons to v0.

On the other hand, when v13 is extracted, polygon P5 was not part of the polygons that were incident to v0. Accordingly, its corresponding vertices are added to F for extraction. Similarly, when v12 is extracted, P6 and P7 are incident polygons that have not been considered and their vertices are added to F.

Figure 6:
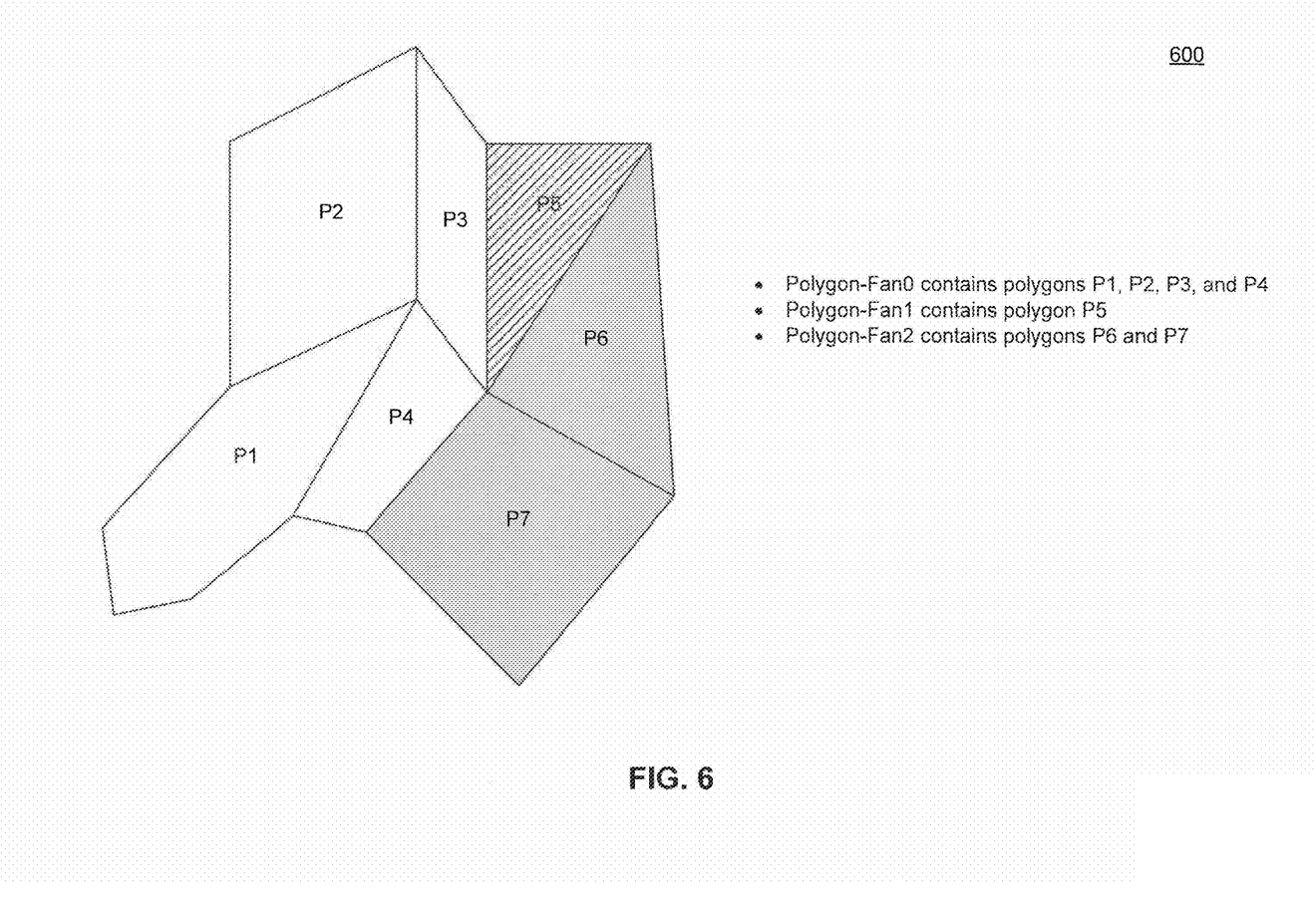
FIG. 6 depicts an example of partitioning polygons into polygon fans for compression purposes, according to an embodiment.

As described above, steps 320 and 330 complete when there are no more vertices in F. FIG. 5 depicts the final traversal order of the vertices, and FIG. 6 depicts the set of polygon fans. Specifically, the polygon mesh 600 in FIG. 6 includes three polygon fans, i.e. polygon-fan 0, polygon-fan 1, and polygon-fan 2. Polygon-fan 0 contains polygons P1 to P4. Polygon-fan 1 contains polygon P5. Polygon-fan 2 contains polygons P6 and P7.

While polygon mesh 500 in FIG. 5 has been partitioned into a set of polygon fans with a unique traversal order of the vertices, polygon mesh 500 is still unsuitable for compression by SC3DMC encoder 160. This is because polygon mesh 500 has been partitioned into polygon fans, and is still composed of polygons rather than triangles. Accordingly, the set of polygon fans of polygon mesh 500 must be tessellated into triangles.

In a step 340, each polygon fan generated in step 330 is tessellated by pre-processing module 120 into one or more triangles based on the traversal order of the vertices. This ensures that the SC3DMC encoder 160, which compresses a triangle mesh according to the SC3DMC-TFAN algorithm, can compress polygon mesh 500.

The basic idea is to introduce extra edges as appropriate for each polygon fan. Specifically, for each polygon that is not a triangle in a polygon fan, pre-processing module 120 introduces extra edges between the central vertex of the polygon fan and the vertices in the polygon that have the lowest traversal order. This causes the polygon to be tessellated entirely into triangles. This process of introducing extra edges is continued until the entire polygon fan degenerates into a triangle fan. The process is then repeated for subsequent polygon fans.

Pre-processing module 120 tessellates the polygons in the order their associated vertices are traversed. In other words, a polygon comprising vertices v'0 and v'1 would be the first polygon to be tessellated. In addition, after each polygon is tessellated, the number of triangles composing the polygon is stored in a memory for decompression purposes. In other words, pre-processing module 120 generates a sequence, and each number in the sequence represents the number of triangles in a corresponding polygon. Thus, a sequence of 3, 5, 2 would indicate that a first polygon in the polygon mesh based on the traversal order contains three triangles, a second polygon contains five triangles, and a last polygon contains two triangles. This generated sequence enables the resulting triangle mesh to be reconstructed into the original polygon mesh.

Figure 7:
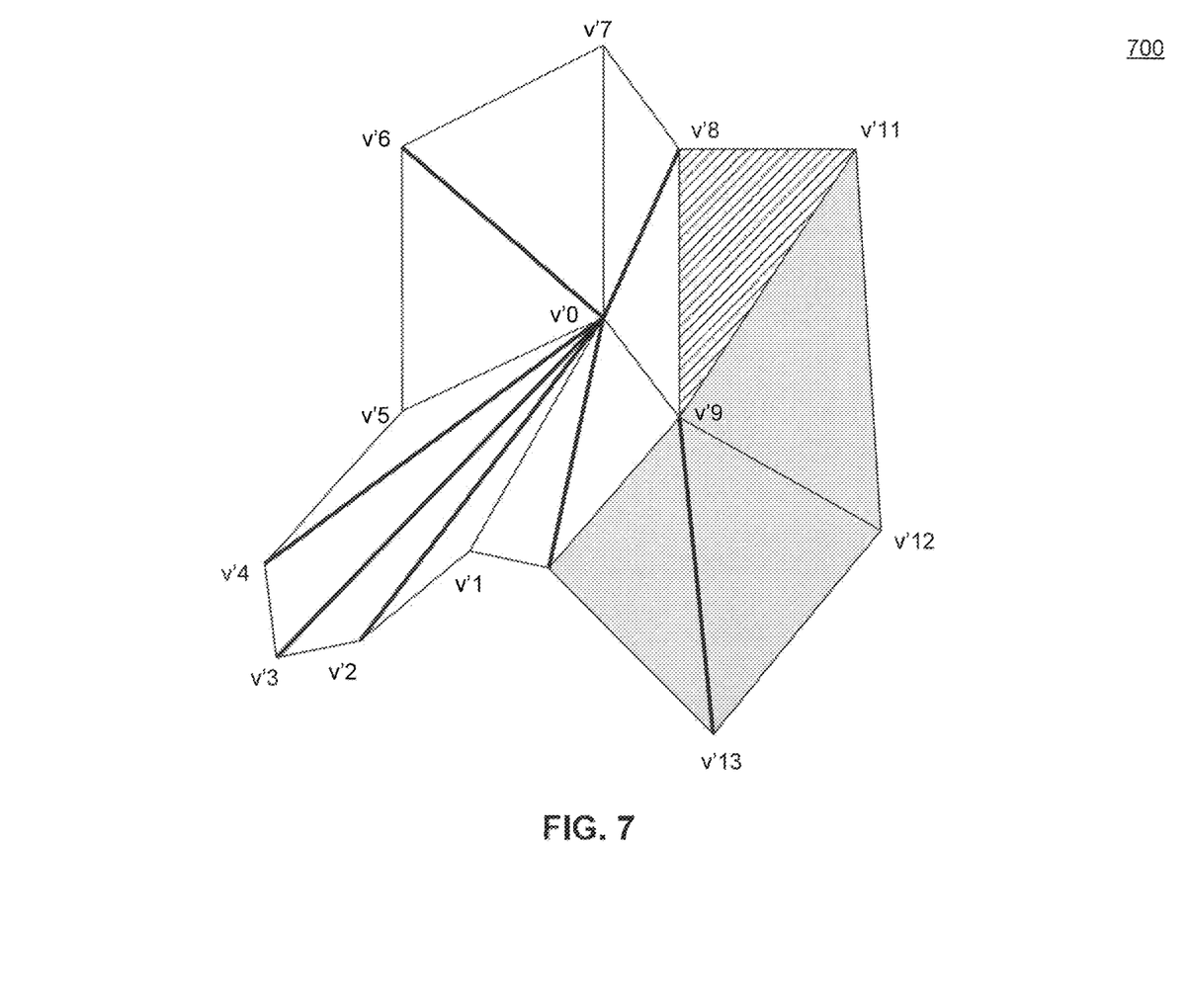
FIG. 7 depicts an example of tessellating polygon fans into triangles for compression purposes, according to an embodiment.

By way of example, FIG. 7 depicts polygon-fan 0 which contains polygons P1 to P4. For polygon P1, extra edges are introduced from vertex v'0 to opposites vertices v'2, v'3, and v'4. This results in P1 being composed entirely of triangles, specifically four triangles. The tessellation process is then repeated for polygons P2, P3, and P4, respectively. As a result, polygon-fan 0 becomes a triangle fan with a central vertex v0 that is composed of ten triangles. The process is then repeated for polygon-fan 1 and polygon-fan 2.

Polygon-fan 1 is already composed solely of triangles. Therefore, no tessellation is performed. However, polygon-fan 2 is not tessellated. Specifically, polygon-fan 2 contains polygons P6 and P7. Polygon P6 is a triangle but polygon P7 is not a triangle. Therefore, pre-processing module 120 introduces an edge between vertices v'9 and v'13. This results in the tessellation of P7 into two triangles. Based on FIG. 7, the sequence generated that describes the number of triangles per polygon is {4, 2, 2, 2, 1, 1, 2}.

In a step 350, a compressed stream is output. The compressed stream contains two pieces of information: the compressed triangle mesh generated in step 340, and the compressed sequence representing the number of triangles per polygon.

Figure 4:
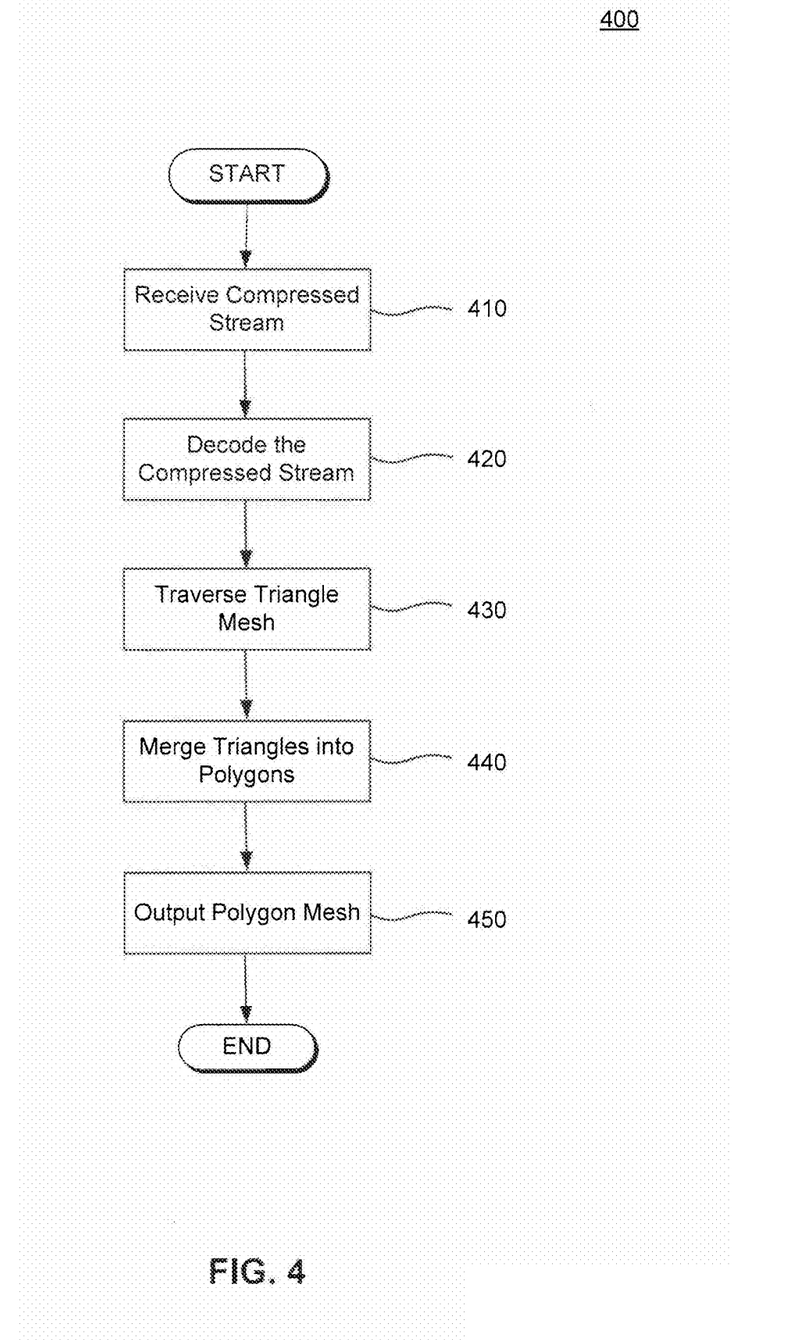
FIG. 4 illustrates a flowchart of an exemplary method for decompressing a polygon mesh, according to an embodiment.

FIG. 4 depicts a block diagram illustrating a method 400 for decompressing a polygon mesh in accordance with an embodiment. As described in more detail below, method 400 may be embodied in software or hardware.

Referring to FIG. 4, method 400 begins at step 410 in which de-mux 220 receives a compressed stream. The compressed stream contains a triangle mesh compressed by SC3DMC encoder 160 that represents a polygon mesh. In addition, the compressed stream contains a sequence compressed by entropy encoder 170 that represents the number of triangles per polygon in the polygon mesh.

In a step 420, de-mux 220 demultiplexes the compressed stream into its component parts. SC3DMC decoder 230 decodes the compressed triangle mesh into triangle mesh 250. Entropy decoder 240 decodes the compressed sequence representing the number of triangles per polygon into sequence 260. Both pieces of information are sent to post-processing module 270 in order to reconstruct the original polygon mesh.

In a step 430, post-processing module 270 traverses the vertices of triangle mesh 250 according to the traversal order specified by pre-processing module 120. Specifically, post-processing module 270 traverses the vertices in the order of their relabeled indices.

Post-processing module 270 considers each vertex in turn. At each step, all the triangles incident to the current vertex are ordered in their decoding order. In other words, triangles incident to the current vertex are ordered based on their corresponding relabeled vertices. For example, in FIG. 7, vertex v'0 is the first vertex considered. V'0 has ten incident triangles. The triangle defined by vertices v'0, v'1, and v'2 is the first incident triangle in the decoding order. Similarly, the triangle defined by vertices v'0, v'2, and v'3 is the second incident triangle in the decoding order. After identifying the incident triangles to the current vertex, post-processing module 270 performs step 440.

In a step 440, the incident triangles are merged into one or more polygons. Specifically post-processing module 270 reads the next number N in sequence 260. Post-processing module 270 then merges the next N incident triangles into a single polygon. These N incident triangles are then marked as visited. This operation is then repeated until all the triangles incident to the current vertex are visited.

Finally, in a step 450, the resulting polygon mesh is output. The resulting polygon mesh is identical to the polygon mesh processed by pre-processing module 120 as described above.

3. Example Computer System Implementation

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific integrated circuits (ASIC), digital signal processors, etc., as will be understood by those skilled in the arts based on the discussion given herein. Accordingly, any processor that performs the functions described herein is within the scope and spirit of the embodiments presented herein.

Figure 8:
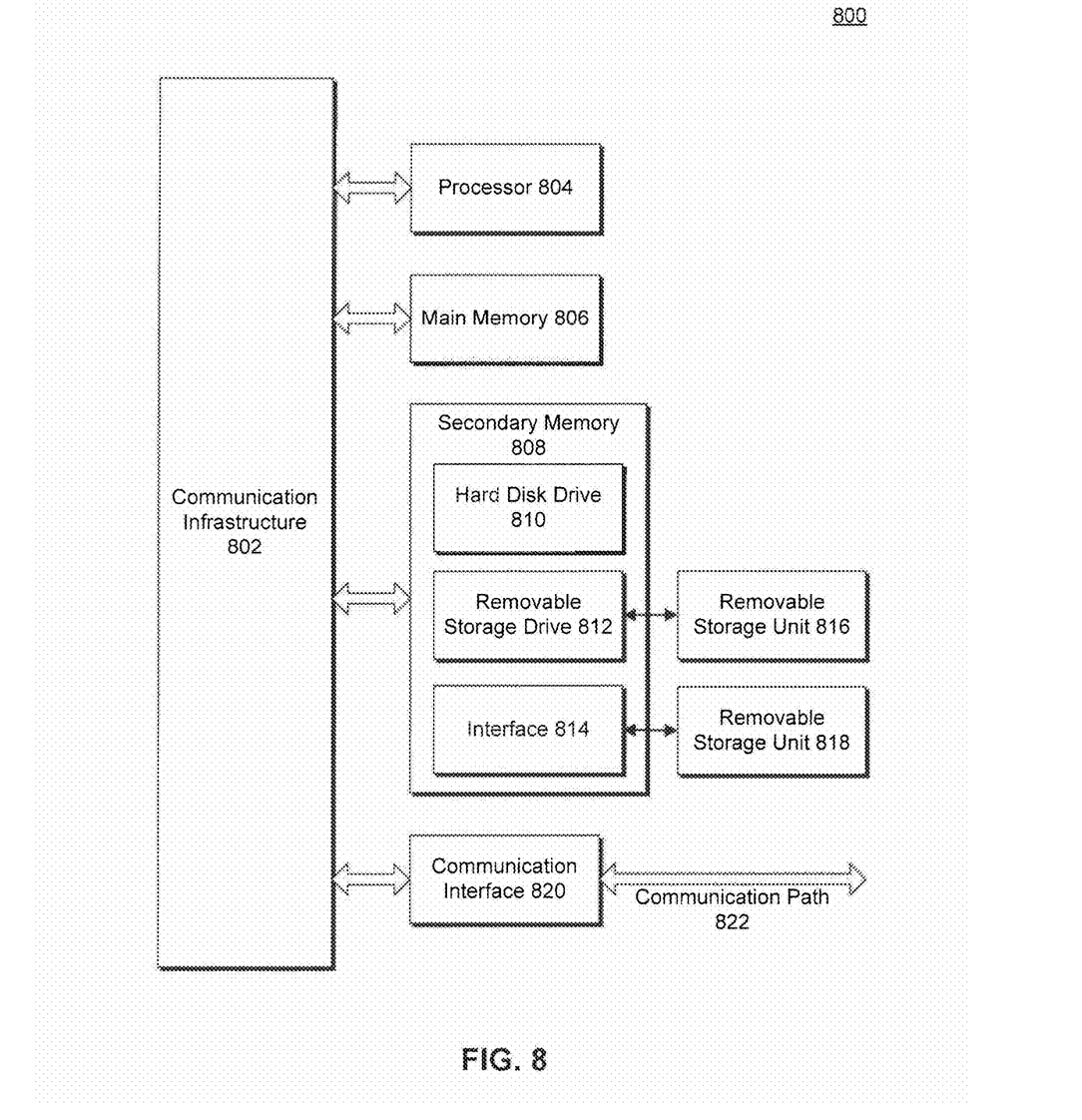
FIG. 8 illustrates a block diagram of an exemplary computer system on which the embodiments can be implemented

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 802 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 806 (e.g., random access memory (RAM)), and may also include a secondary memory 808. Secondary memory 808 may include one or more of, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and another removable storage unit 818 and interface 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 300.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 304 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The Summary and Abstract sections may set forth one or more but not all exemplary embodiments as contemplated by the inventor(s), and thus, are not intended to limit the embodiments and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A polygon mesh compression system comprising:
    a processor configured to perform operations comprising:
        traversing vertices of a plurality of polygons in a polygon mesh, in an order of traversal, the plurality of polygons comprising a plurality of non-triangle polygons;
        partitioning the polygon mesh comprising the plurality of non-triangle polygons into an ordered set of polygon fans in the order of traversal, at least one of the polygon fans having a plurality of polygons, each polygon fan being defined by corresponding vertices of one or more polygons in the polygon fan in the order of traversal and, for the at least one polygon fan having the plurality of polygons, the order of traversal starts from a common vertex of the plurality of polygons in the at least one polygon fan;
        converting the polygon mesh comprising the plurality of non-triangle polygons to a triangle mesh by:
            tessellating each non-triangle polygon in the ordered set of polygon fans into triangles from the common vertex to corresponding vertices of each non-triangle polygon in the order of traversal; and
            generating an ordered set of triangle fans in the order of traversal; and
    an encoder configured to receive the triangle mesh and the ordered set of triangle fans and compress the polygon mesh using the triangle mesh and the ordered set of triangle fans.

2. The system of claim 1, wherein the partitioning comprises:
    adding an incident polygon to a polygon fan of the set of polygon fans, wherein the common vertex is a central vertex of the polygon fan, the incident polygon is non-visited, and either the incident polygon has an orientation that is the same as an orientation of a neighbor polygon in the polygon fan or the incident polygon has no neighbor polygon in the polygon fan.

3. The system of claim 1, wherein the tessellating comprises:
    inserting, for at least two non-triangle polygons in the at least one polygon fan, one or more edges between the common vertex of the at least two non-triangle polygons and other vertices of a corresponding one of the at least two non-triangle polygons in the order of traversal of the other vertices.

4. The system of claim 1, wherein the processor is further configured to perform operations comprising:
    outputting, to the encoder, the triangle mesh based on the tessellating.

5. The system of claim 1, wherein the processor is further configured to perform operations comprising:
    outputting the ordered set of triangle fans based on the tessellating.

6. The system of claim 1, wherein the processor is further configured to perform operations comprising:
    generating, in the order of traversal, a sequence of values each corresponding to a number of triangles for each of the plurality of polygons;
    outputting the number of triangles for each polygon in a polygon fan of the set of polygon fans.

7. The system of claim 6, wherein the encoder comprises:
    a first encoder configured to receive the triangle mesh and the ordered set of triangle fans and compress the polygon mesh using the triangle mesh and the set of triangle fans; and
    an entropy encoder configured to receive and compress the sequence of values.

8. The system of claim 1, wherein the at least two non-triangle polygons share a common edge.

9. A method for compressing a polygon mesh comprising traversing vertices of a plurality of polygons in a polygon mesh, in an order of traversal, the plurality of polygons comprising a plurality of non-triangle polygons;
    partitioning the polygon mesh comprising the plurality of non-triangle polygons into an ordered set of polygon fans in the order of traversal, at least one of the polygon fans having a plurality of polygons, each polygon fan being defined by corresponding vertices of one or more polygons in the polygon fan in the order of traversal and, for the at least one polygon fan having the plurality of polygons, the order of traversal starts from a common vertex of the plurality of polygons in the at least one polygon fan;
    converting the polygon mesh comprising the plurality of non-triangle polygons to a triangle mesh by:
        tessellating each non-triangle polygon in the ordered set of polygon fans into triangles from the common vertex to corresponding vertices of each non-triangle polygon in the order of traversal; and
        generating an ordered set of triangle fans in the order of traversal; and
    compressing the polygon mesh using the triangle mesh and the ordered set of triangle fans.

10. The method recited in claim 9, wherein the partitioning comprises:
    adding the incident polygon to a polygon fan of the set of polygon fans, wherein the common vertex is a central vertex of the polygon fan, the incident polygon is non-visited, and either the incident polygon has an orientation that is the same as an orientation of a neighbor polygon in the polygon fan or the incident polygon has no neighbor polygon in the polygon fan.

11. The method recited in claim 9, wherein the tessellating comprises:
    inserting, for the at least two non-triangle polygons in a the at least one polygon fan, one or more edges between the common vertex of the at least two non-triangle polygons and other vertices of a corresponding one of the at least two non-triangle polygons in the order of traversal of the other vertices.

12. The method recited in claim 9, further comprising:
    outputting, to the encoder, the triangle mesh based on the tessellating.

13. The method recited in claim 9, further comprising:
outputting the ordered set of triangle fans based on the tessellating.

14. The method recited in claim 9, further comprising:
generating, in the order of traversal, a sequence of values each corresponding to a number of triangles for each of the plurality of polygons;
outputting the number of triangles for each polygon in a polygon fan of the set of polygon fans.

15. The method recited in claim 9, wherein the compressing further comprises:
compressing the polygon mesh using the triangle mesh and the set of triangle fans; and
compressing the sequence of values.

16. A computer-readable storage device having computer-executable instructions stored thereon, execution of which, by a computing device, causes the computing device to perform operations comprising:
traversing vertices of a plurality of polygons in a polygon mesh, in an order of traversal, the plurality of polygons comprising a plurality of non-triangle polygons;
partitioning the polygon mesh comprising the plurality of non-triangle polygons into an ordered set of polygon fans in the order of traversal, at least one of the polygon fans having a plurality of polygons, each polygon fan being defined by corresponding vertices of one or more polygons in the polygon fan in the order of traversal and, for the at least one polygon fan having the plurality of polygons, the order of traversal starts from a common vertex of the plurality of polygons in the at least one polygon fan;
converting the polygon mesh comprising the plurality of non-triangle polygons to a triangle mesh by:
tessellating each non-triangle polygon in the ordered set of polygon fans into triangles from the common vertex to corresponding vertices of each non-triangle polygon in the order of traversal; and
generating an ordered set of triangle fans in the order of traversal; and
compressing the polygon mesh using the triangle mesh and the ordered set of triangle fans.

17. The computer-readable storage device recited in claim 16, wherein the partitioning comprises:
adding the incident polygon to a polygon fan, wherein the common vertex is a central vertex of the polygon fan, the incident polygon is non-visited, and either the incident polygon has an orientation that is the same as an orientation of a neighbor polygon in the polygon fan or the incident polygon has no neighbor polygon in the polygon fan.

18. The computer-readable storage device recited in claim 16, wherein the tessellating comprises:
inserting, for at least two non-triangle polygons in the at least one polygon fan, one or more edges between the common vertex of the at least two non-triangle polygons and other vertices of a corresponding one of the at least two non-triangle polygons in the order of traversal of the other vertices.

* * * * *